US010502342B2

(12) United States Patent
Milroy et al.

(10) Patent No.: US 10,502,342 B2
(45) Date of Patent: Dec. 10, 2019

(54) ROD-MOUNTED BUFFER TO CUSHION CHECK VALVE CLOSURE

(71) Applicant: Mueller International, LLC, Atlanta, GA (US)

(72) Inventors: Jeff Milroy, Glen Ellyn, IL (US); Stephen J. Smick, Oswego, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 15/617,674

(22) Filed: Jun. 8, 2017

(65) Prior Publication Data

US 2018/0356002 A1    Dec. 13, 2018

(51) Int. Cl.
   *F16K 47/02*   (2006.01)
   *F16K 15/03*   (2006.01)
   *F16K 15/18*   (2006.01)

(52) U.S. Cl.
   CPC .......... *F16K 47/023* (2013.01); *F16K 15/031* (2013.01); *F16K 15/181* (2013.01)

(58) Field of Classification Search
   CPC ........ F16K 47/04; F16K 15/03; F16K 47/023; Y10T 137/785; E03F 7/04; E03C 1/104
   USPC ............................................. 251/48, 85, 285
   See application file for complete search history.

(56) References Cited

U.S. PATENT DOCUMENTS

| | | | |
|---|---|---|---|
| 580,294 A | 4/1897 | Stone | |
| 1,388,246 A | 8/1921 | Elliott | |
| 2,285,324 A | 6/1942 | Alexander | |
| 2,514,838 A | 7/1950 | Callahan | |
| 3,098,502 A | 7/1963 | Deve | |
| 4,249,568 A | 2/1981 | Duggan | |
| 4,330,006 A | 5/1982 | Eck et al. | |
| 5,078,363 A | 1/1992 | Gregory | |
| 5,769,116 A * | 6/1998 | Yokota | E03C 1/104 137/514 |
| 6,050,294 A | 4/2000 | Makowan | |
| 7,422,029 B2 | 9/2008 | Denike et al. | |
| 10,180,198 B2 | 1/2019 | Milroy et al. | |
| 2018/0356001 A1 | 12/2018 | Milroy et al. | |

OTHER PUBLICATIONS

Definition of "Bore" from Merriam-Webster; https:www.merriam-webster.com/dictionary/bore, accessed on May 1, 2018, 1 pg.
Milroy, Jeff; Non-Final Office Action for U.S. Appl. No. 15/617,666, filed Jun. 8, 2017, May 8, 2018, 18 pgs.

(Continued)

*Primary Examiner* — Reinaldo Sanchez-Medina
*Assistant Examiner* — Nicole Gardner
(74) *Attorney, Agent, or Firm* — Taylor English Duma LLP

(57) ABSTRACT

A check valve for a fluid system includes: a valve body defining an inlet, an outlet, and an interior cavity; a closing member positioned inside the interior cavity, the closing member movable between an open position, providing fluid communication between the inlet and outlet, and a closed position, isolating the inlet from the outlet; and a buffer mounted on the valve body, the buffer configured to hold a portion of fluid in the fluid system and cushion movement of the closing member from the open position to the closed position.

23 Claims, 11 Drawing Sheets

(56) References Cited

OTHER PUBLICATIONS

APCO; Operation and Maintenance Instructions for Slanting Disc Check Valve with Bottom Mounted Buffer, publicly available prior to Jun. 8, 2017, 4 pgs.
APCO; Specification Sheet for Rubber Flapper Check Valve with Spring Return Attachment, dated Oct. 24, 2006, 2 pgs.
DeZurik; Brochure entitled "Pressure Temperature Ratings Guide", May 2009, 4 pgs.
DeZurik; Brochure for APCO CSD-800 Slanting Disc Check Valves, Mar. 2014, 19 pgs.
Valmatic; Brochure for Surgerbuster Check Valves, copyright 2013, 8 pgs.
Milroy, Jeff; Corrected Notice of Allowance for U.S. Appl. No. 15/617,666, filed Jun. 8, 2017, dated Nov. 30, 2018, 6 pgs.
Milroy, Jeff; Notice of Allowance for U.S. Appl. No. 15/617,666, filed Jun. 8, 2017, dated Oct. 12, 2018, 8 pgs.
Milroy, Jeff; Corrected Notice of Allowance for U.S. Appl. No. 15/617,666, filed Jun. 8, 2017, dated Dec. 12, 2018, 7 pgs.
Milroy, Jeff; Issue Notification for U.S. Appl. No. 15/617,666, filed Jun. 8, 2017, dated Dec. 22, 2018, 1 pg.

\* cited by examiner

ROD-MOUNTED BUFFER TO CUSHION CHECK VALVE CLOSURE

TECHNICAL FIELD

Field of Use

This disclosure relates to valves. More specifically, this disclosure relates to check valves for regulating fluid flow.

Related Art

In a fluid system that transports a fluid from one location to another, it can be desirable to allow the fluid to flow in only one direction. A check valve, a type of valve that typically allows fluid flow in only one direction, typically comprises a closing member that is configured to cover an internal opening in the valve to close the valve and to move away from the internal opening to open the valve. When a pump positioned upstream from a check valve in such a fluid system shuts down, any delay between when the pump stops pushing the fluid and when the check valve is fully closed can allow the fluid to flow in reverse. Reverse flow can cause the closing member to slam closed, creating noise and vibration in the piping system due to the resulting pressure spike sometimes described as "water hammer," which can potentially damage the closing member and other fluid system components upstream from the check valve over long periods of use.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a check valve for a fluid system, the check valve comprising: a valve body defining an inlet, an outlet, and an interior cavity extending from the inlet to the outlet; a flapper positioned inside the interior cavity, the flapper movable between an open position, providing fluid communication between the inlet and outlet, and a closed position, isolating the inlet from the outlet; a rod positioned at least partially inside the valve body and comprising a first end proximate to the flapper and a second end distal from the first end, the rod positioned at an angle with respect to the flapper, a distance from the first end of the rod to the flapper adjustable by manipulation of the second end of the rod from outside the valve body, an axially outermost portion of the first end of the rod relative to an axis defined by the rod facing an upstream surface of the flapper; and a buffer mounted on the first end of the rod, the buffer configured to hold a portion of fluid in the fluid system and cushion movement of the flapper from an open position to a closed position when the flapper is proximate to the closed position.

In a further aspect, disclosed is a check valve for a fluid system, the check valve comprising: a valve body defining an inlet, an outlet, and an interior cavity; a closing member positioned inside the interior cavity, the closing member movable between an open position, providing fluid communication between the inlet and outlet, and a closed position, isolating the inlet from the outlet; and a buffer mounted on the valve body, the buffer configured to hold a portion of fluid in the fluid system and cushion movement of the closing member from the open position to the closed position.

In yet another aspect, disclosed is a method of using a check valve in a fluid system comprising a fluid, the method comprising: moving a closing member positioned inside an interior cavity of the check valve toward an open position, the open position providing fluid communication between an inlet and an outlet of the check valve, the check valve comprising a valve body defining the inlet, the outlet, and the interior cavity; moving the closing member of the check valve toward a closed position; and stopping movement of the closing member when the closing member is in a position proximate to the closed position with a buffer configured to hold a portion of the fluid and mounted on a first end of a rod of a buffering device.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures can be designated by matching reference characters for the sake of consistency and clarity.

DETAILED DESCRIPTION

Figure 1:
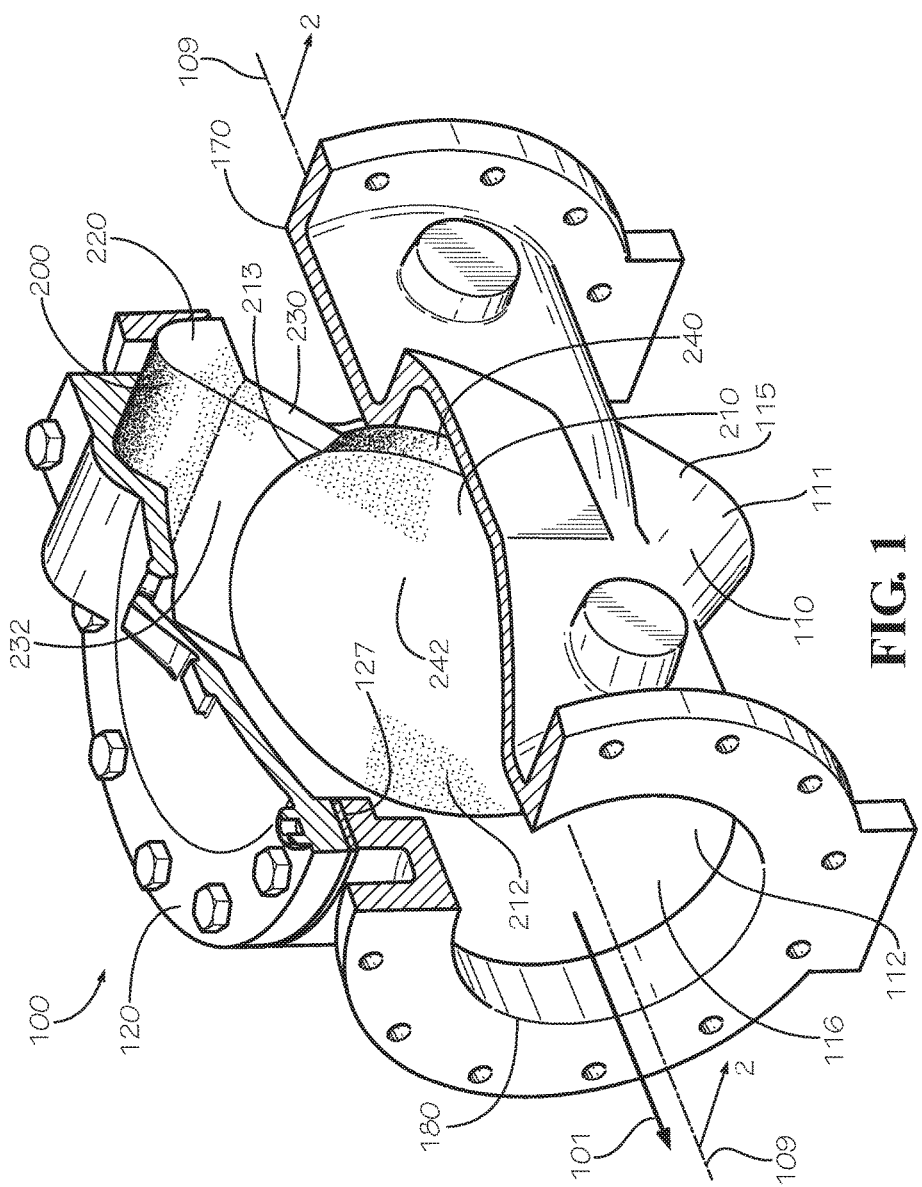
FIG. 1 is perspective cut-away view of a check valve comprising a flapper in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

In one aspect, a check valve and associated methods, systems, devices, and various apparatuses are described herein. The check valve can comprise a closing member such as a flapper or a disc. The check valve can further comprise a surge suppressor comprising a buffer, which can function as a cushioning device. In one aspect, the check valve disclosed herein can be, for example and without limitation, a full flow valve in which the flow area is equal to or greater than the equivalent pipe size throughout. In another aspect, the check valve disclosed herein can be a partial flow valve in which the flow area is less than the equivalent pipe size throughout. A "check valve" can be not only a valve described as a check valve such as a flapper check valve but also any valve that regulates flow of a fluid including, for example and without limitation, swing check valves and tilting or slanting disc check valves, such as configured with or without a bottom buffer.

Various materials can be used to fabricate the various components of the check valve 100. The disclosure of the specific materials or finishes or types of materials or finishes listed, however, is not intended to be limiting on the current disclosure. One of ordinary skill in the art would know to substitute equivalent materials where appropriate.

Figure 2:
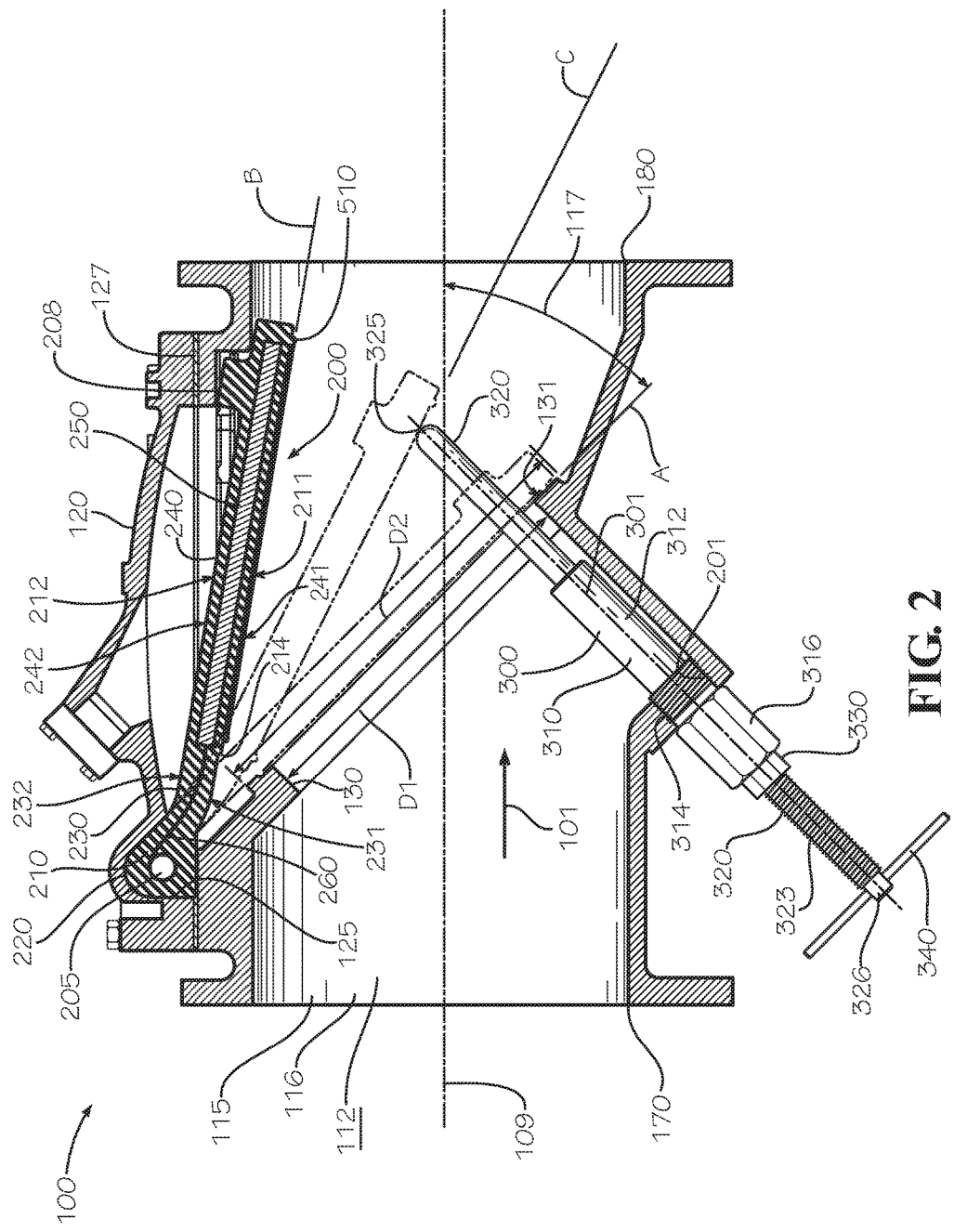
FIG. 2 is a sectional view of the check valve of FIG. 1 taken along line 2-2 of FIG. 1 in accordance with another aspect of the current disclosure wherein the flapper comprises a hinge pin and a buffering device.

In one aspect, as shown in FIGS. 1 and 2, a check valve 100 can comprise a valve body 110 and a closing member 200, which can define a primary flow direction 101. The valve body 110 can define an inlet 170, an outlet 180, an outer surface 111, and an interior cavity 116 defining an inner surface 112. The inner surface 112 can be coated with an epoxy film or other coating to prevent the fluid in the valve from contacting the material used to form the valve body 110.

As shown in FIG. 2, the valve body can define a port 130 in the interior cavity 116 comprising a circumferential downstream port shoulder surface 131 against which a rib 510 of a resilient body 210 of the closing member 200 can contact. The port shoulder surface 131 of the port 130 of the valve body 110 can define an inside diameter D1 and an outside diameter D2. The valve body 110 can comprise an inlet flange defining mounting holes and an outlet flange defining mounting holes. The check valve 100 can further define an access port 201 configured to receive a removable access plug (not shown) able to provide access to the interior cavity 116 so that any fluid inside the check valve 100 can be drained out by use of a buffering device 300, which can also be an external backflow device or a hold-open device, able to manually open the closing member 200 or upon removal of the buffering device 300 allow draining of the fluid out of the check valve 100.

The valve body 110 can comprise a valve cover 120 that can be separate from a main portion 115 of the valve body 110 and attached to the main portion 115 with a plurality of fasteners. In one aspect, the valve cover 120 can comprise an outer surface, an inner surface, a boss, a boss cover, and a plurality of mounting fasteners. The valve cover 120 can define a plurality of mounting holes for mounting the boss cover with a plurality of boss cover fasteners. In another aspect, the boss cover can be replaced with a mechanical position indicator (not shown) or other check valve accessory and can be removed to allow access to the interior of the check valve 100. In yet another aspect, the boss, the boss cover, and the boss cover fasteners may not be present on the valve cover 120.

A gasket 127 can be positioned between the main portion 115 and the valve cover 120 to facilitate a tight seal between the main portion 115 and the valve cover 120. The gasket 127 can define holes (not shown) to provide clearance for fasteners. The gasket 127 can additionally define holes that provide clearance for movement of parts of a valve position indicator (not shown), which in some installations as previously noted can be mounted to the boss of the valve cover 120. The valve position indicator can indicate the position of the closing member 200 of the check valve 100—whether the check valve 100 is open or closed or somewhere in between. The gasket 127 can be made from a rubber such as, for example and without limitation, Buna-N rubber (i.e., nitrile), ethylene propylene diene (EPDM) rubber, or silicone.

Components of the check valve 100, including the valve body 110 and the valve cover 120, can be made from, for example and without limitation, ductile iron or an equivalently suitable iron material. Any portion of the check valve 100 including the valve body 110 or the buffering device 300 can also be made from another material or a combination of other materials including steel (including stainless steel), copper, bronze, brass, plastic (including fiber-reinforced plastic), or an equivalently suitable material including that which is corrosion-resistant as desired for corrosive environments.

As shown in FIG. 2, the valve body 110 can further comprise a recess 125 positioned proximate to a portion of the port shoulder surface 131 in which a hinge portion 220 of the resilient body 210 of the closing member 200 is configured to be fixedly mounted. The valve body 110 can extend along a longitudinal axis 109 of the valve body 110 defined between the inlet 170 and the outlet 180. The port shoulder surface 131 can be angled with respect to the longitudinal axis 109 by an angle 117 measuring between 0 and 90 degrees. For example and without limitation, the angle 117 can be about 45 degrees. Where the port shoulder surface 131 is angled with respect to the longitudinal axis 109 by the angle 117, the recess 125 can be positioned upstream from the port shoulder surface 131.

The closing member 200 is shown in solid lines in FIG. 2 in an open position B and is shown in broken lines in FIG. 2 in a closed position A and in an intermediate position C. In one aspect, as shown, the closing member 200 can comprise the resilient body 210. In another aspect, the closing member 200 need not comprise any resilient structure. As shown in FIG. 1, the resilient body 210 can be a monolithic body comprising the proximal hinge portion 220, an intermediate portion 230, and a distal flap portion 240.

The resilient body 210 can extend from the hinge portion 220 to the intermediate portion 230 to the flap portion 240. The resilient body can comprise a stopper 208. As described above, the hinge portion 220 can be configured to fixedly mount in the valve body 110. Where the closing member 200 of a valve or its equivalent opens differently or has a different pivot position, material, or other structure, the closed position A, the open position B, and the intermediate position C can correspond to a closed position, an open position, and an intermediate position for such valve.

The closing member 200 can be a flapper. As will be described, the flapper can rotate about a single pivot point or hinge point to selectively cover an opening, such as the port 130, within the check valve 100 to close the check valve 100, or the flapper can, in other aspects, rotate in other ways such as through the use of a linkage system which includes both rotational and translational motion. The flapper can be formed from a material that is at least partly resilient or flexible. The closing member 200 can also be a disc formed from a completely rigid material or a combination of rigid and resilient or flexible materials. In some aspects, a flapper can be a disc, also known as a "flapper disc" or a "disc flapper." The flapper disc can be an encapsulated disc that is rigid and is enclosed by a resilient or flexible material such as rubber. A flapper or a disc can be substantially planar in shape. A flapper or a disc can, for example and without limitation, be circular or comprise circular elements when viewed while facing its upstream or downstream surface. The closing member 200 can also be, for example and without limitation, a ball or any other structure that is configured to cover an internal opening in the check valve 100 to close the valve and to move away from the internal opening to open the valve.

As shown in FIG. 2, the intermediate portion 230 and the flap portion 240 together can define an upstream surface 211 and a downstream surface 212. The intermediate portion 230 can define an upstream surface 231 and a downstream surface 232 and the flap portion 240 can define an upstream surface 241 and a downstream surface 242. The upstream surface 211 can comprise the upstream surfaces 231 and 241 and the downstream surface 212 can comprise the downstream surfaces 232 and 242. As shown, the flap portion 240 can be, for example and without limitation, substantially round or circular in shape and having a thickness. The flap portion 240 as well as the resilient body 210 overall can be fabricated from a polymeric material such as, for example and without limitation, Buna-N (i.e., nitrile), ethylene propylene diene (EPDM) rubber, urethane, and other resilient materials. The process used to form the resilient body 210 can be a molding process such as, for example and without limitation, a compression molding process.

The downstream surface 212 of the resilient body 210 can define a first step 213 (shown in FIG. 1) at a transition from the intermediate portion 230 to the flap portion 240. The upstream surface 211 of the resilient body 210 can define a second step 214 at the transition from the intermediate portion 230 to the flap portion 240.

The closing member 200 can comprise a hinge pin 205 and a stiffening insert 250 wrapped with a reinforcement strap 260 and encapsulated within the resilient body 210. The hinge pin 205 can help the hinge portion 220 of the resilient body 210 keep its shape when sandwiched between the valve body 110 and the valve cover 120, while the stiffening insert 250 can help keep the flap portion 240 of the resilient body 210 flat under pressure and during opening and closing of the check valve 100. The reinforcement strap 260 can couple the stiffening insert 250 to the hinge pin 205 and can wrap at least partially around the stiffening insert 250 and the hinge pin 205. As shown in FIG. 1, however, the closing member 200 need not comprise the hinge pin 205, the stiffening insert 250, or the reinforcement strap 260. The stiffening insert 250 and the hinge pin 205 can be made from a steel such as, for example and without limitation, hot-rolled steel. The stiffening insert 250 or the hinge pin 205 can also be made from another metal, a polymer, or any rigid material or from a combination of two or more of these materials. For example and without limitation, the reinforcement strap 260 can be made from a cloth such as fiberglass cloth or from a nylon material or other flexible material having similar mechanical properties. The reinforcement strap 260 can also be made from another material or combination of materials with a tensile strength and other properties resulting in the reinforcement strap 260 being able to prevent resilient body 210 from stretching or deforming over time.

As shown in FIG. 2, the buffering device 300 can hold open the closing member 200 at the intermediate position C, which is located between the closed position A and the open position B. The buffering device 300 can be made to hold the closing member 200 in any position or can be adjusted so that it does not contact the closing member 200 even when the closing member 200 is in the closed position A. The buffering device 300 can comprise a housing 310, a rod 320, a nut 330, a handle 340, an O-ring (not shown), and a wiper ring (also not shown). Both the O-ring and the wiper ring can be positioned inside the housing 310 between the rod 320 and the housing 310 and can be configured to prevent leakage of fluid out of the interior cavity 116 of the check valve 100 through the buffering device 300. The housing 310 can comprise a sheath portion 312 to conceal and/or guide the rod 320, a threaded portion 314 to secure the buffering device 300 to the valve body 110, and a hex portion 316 to facilitate assembly of the buffering device 300 to the check valve 100. The threaded portion 314 can define, for example and without limitation, male NPT threads sized to be received within the access port 201, which can define female NPT threads or any other matching thread configuration.

The rod 320 can comprise a first end 325 proximate to the closing member 200, a second end 326 distal from the first end 325, and a threaded portion 323 that when rotated as part of the rod 320 can cause the rod 320 to move in one direction or another along an axis 301 of the buffering device 300. The rod 320 and the housing 310 of the buffering device 300 can be positioned at least partially inside the valve body 110. The handle 340, which can be sized to fit within a bore 329 (shown in FIG. 10) defined in the second end 326 of the rod 320, can be used to produce such movement of the rod 320 along the axis 301. By such movement, produced by manipulation of the second end 326 of the rod 320 from outside the valve body 110 by rotation of the handle 340, a distance from the first end 325 of the rod 320 to the closing member 200 can be adjusted. An axial outermost surface or tip of the first end 325 of the rod 320 can face the upstream surface 211 of the closing member 200. As shown, the rod 320 can extend the full length of the buffering device 300 along the axis 301 from the first end 325 to the second end 326.

Figure 3:
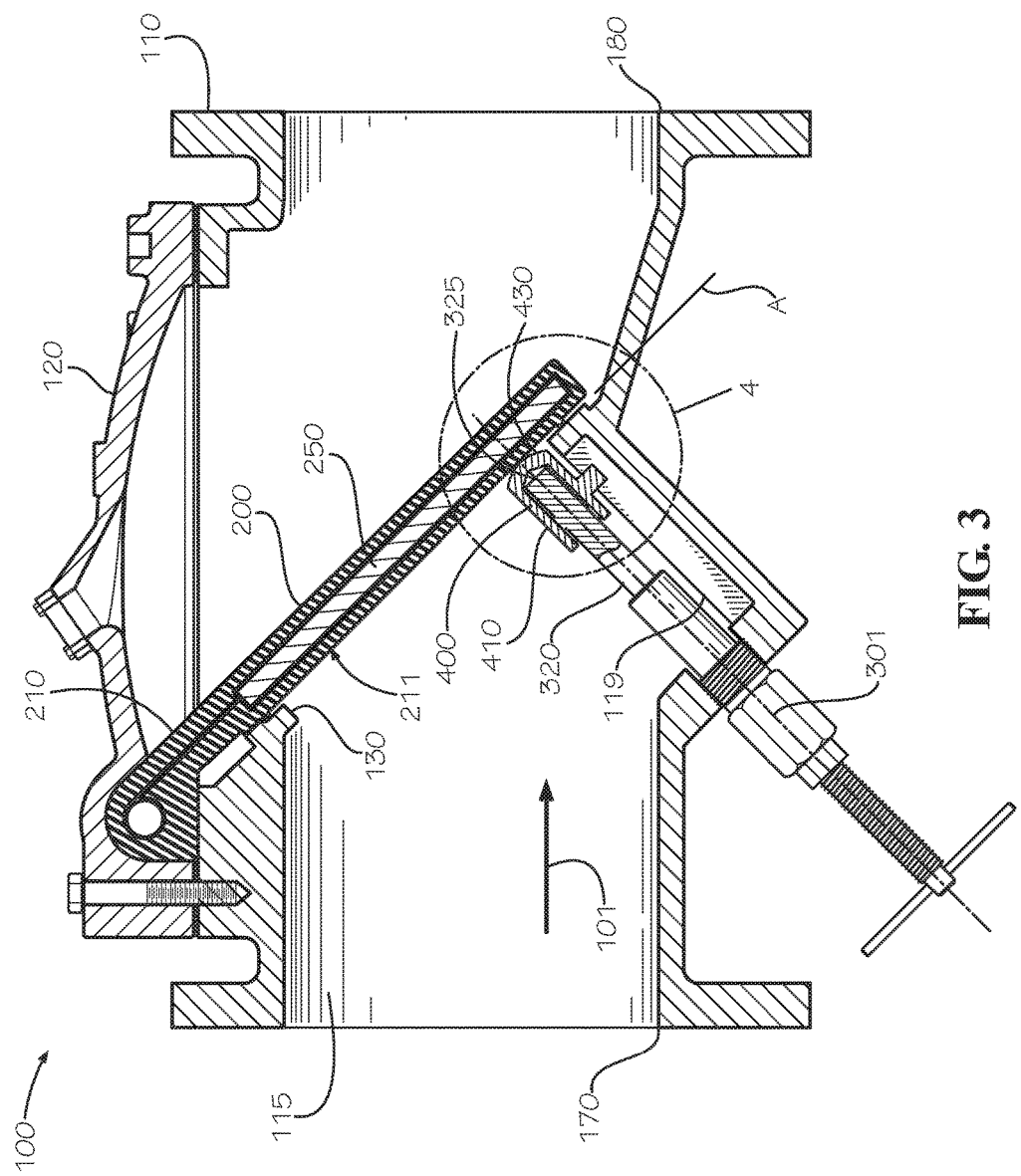
FIG. 3 is a sectional view of the check valve of FIG. 1 taken along line 2-2 of FIG. 1 wherein a buffer is mounted on and enclosed about a rod of a buffering device.

As shown in FIG. 3, the buffer 400 can comprise a body 410 and can be mounted on the rod 320 and is thereby not coupled to any other portion of the check valve 100. More specifically, the body 410 of the buffer 400 can be configured to wrap around or enclose the first end 325 of the rod 320. By coupling the buffer 400 to the rod 320, the construction of the closing member 200 can be simplified, and closing members of various shapes, sizes, and constructions can be used as-is. The closing member 200 need only have a surface such as the upstream surface 211 against which a tip 430 of the body 410 of the buffer 400 can contact. Moreover, the buffer 400 can be made to contact any exposed portion of the closing member 200 while ensuring that alignment of the axis 301 of the rod 320 and the axis 401 (shown in FIG. 4) of the buffer 400 is maintained. As a result, the buffering device 300 with the buffer 400 can be made a "drop-in" replacement for any other buffering device used in the check valve 100 without the need to replace the closing member 200 or any other component of the check valve 100.

Figure 4:
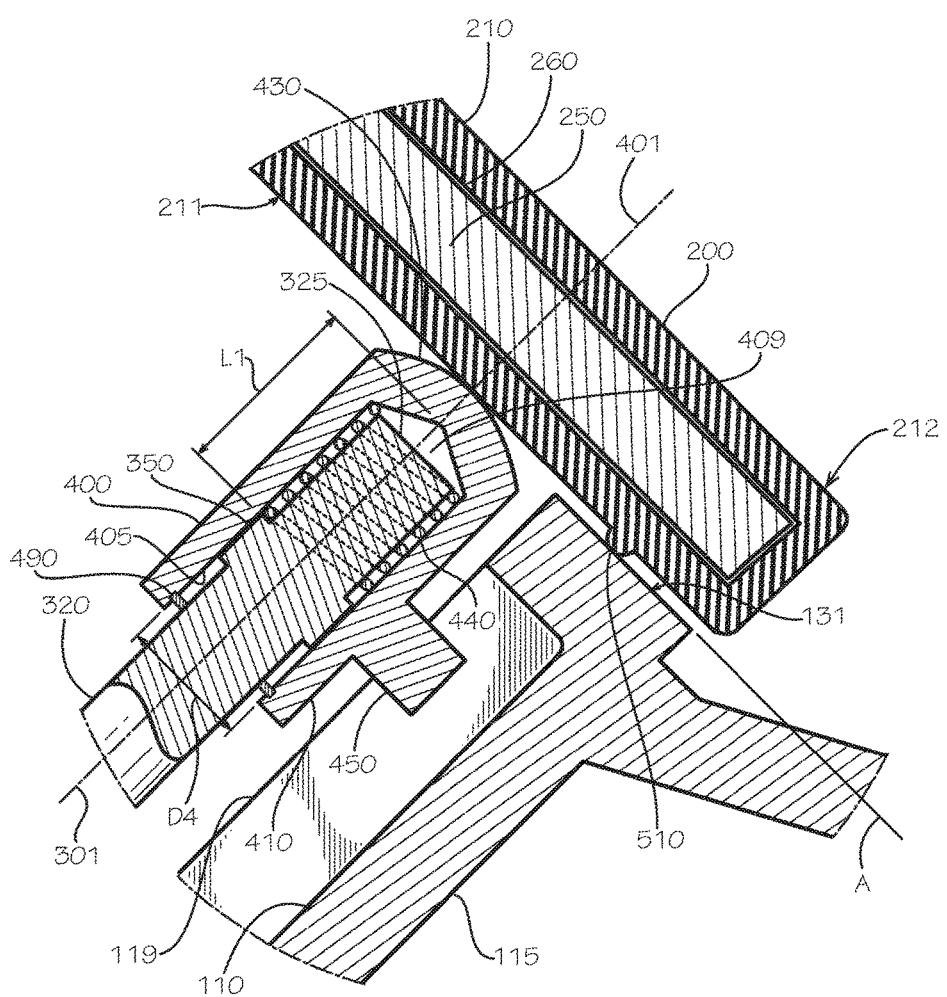
FIG. 4 is a detail view of the check valve of FIG. 3 taken from detail 4 of FIG. 3 showing the flapper in a closed position.

As shown in FIG. 4, the buffer 400 can be configured so that the closing member 200 is cushioned by contact with the body 410 of the buffer 400 yet still allowed to fully close in the closed position A. Internally, the buffer 400 can comprise a biasing element 440, which can be a spring, and the rod 320 can comprise a flange 350. The buffer 400 can further comprise a retaining fastener 490 to help ensure that the body 410 of the buffer 400 remains fastened about the biasing element 440 and the flange 350. The chamber length L1 can be measured from one axial end of the buffer inner chamber 409 proximate to the tip 430 to the flange 350 of the rod 320. The buffer 400 is shown with the biasing element 440 almost fully compressed in a retracted position. The biasing element 440 can be configured as shown to fit between the rod 320 and the bore 405 of the buffer 400. The flange 350 of the rod 320 can be configured to fit within the bore 405. In one aspect, the flange 350 of the rod 320 can be configured to fit snugly within the bore 405 such that the rod 320 and the buffer 400 cannot physically become misaligned along their respective axes 301,401. In another aspect, the flange 350 of the rod 320 can be configured to fit more loosely within the bore 405. Externally, in one aspect, the body 410 of the buffer 400 can comprise a tab 450 that can be configured to ride within a groove or slot 119 in the valve body 110. In another aspect, as shown in FIG. 7, no such tab is present.

Figure 5:
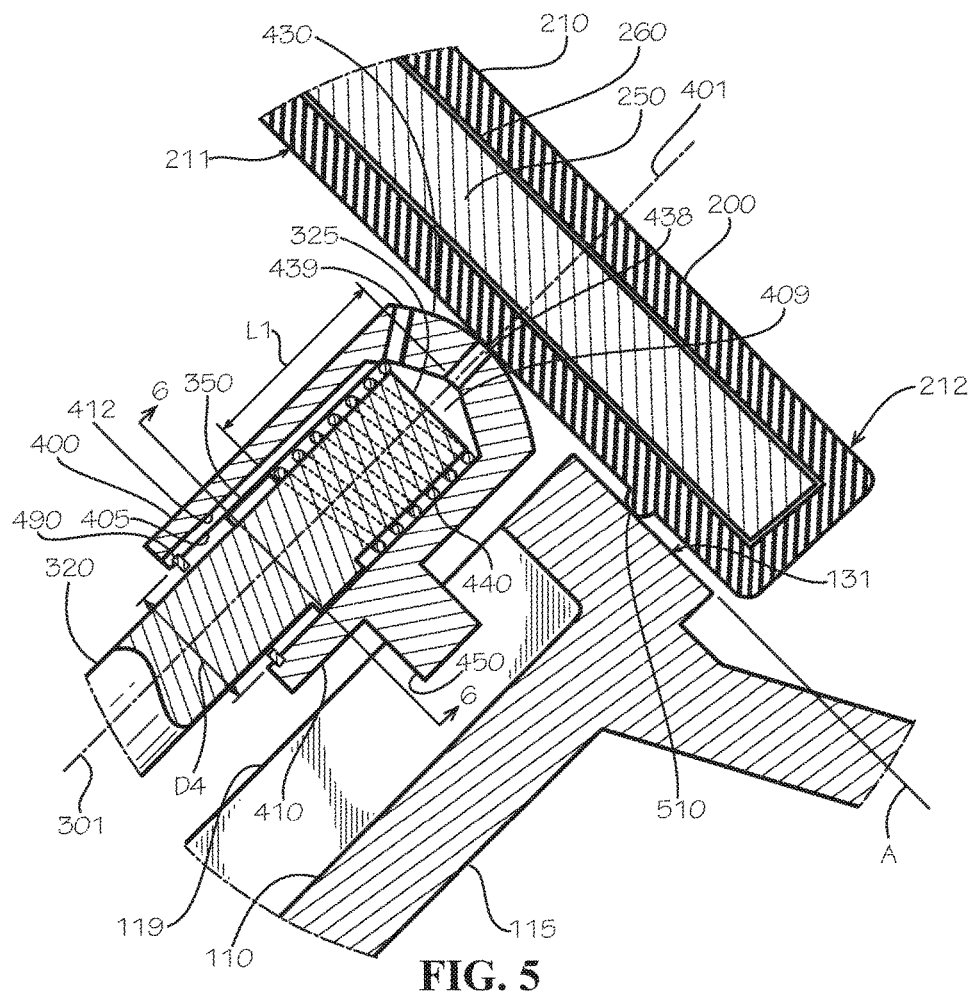
FIG. 5 is a detail view of the check valve of FIG. 3 taken from detail 4 of FIG. 3 in accordance with another aspect of the current disclosure showing the flapper in a closed position.
Figure 6:
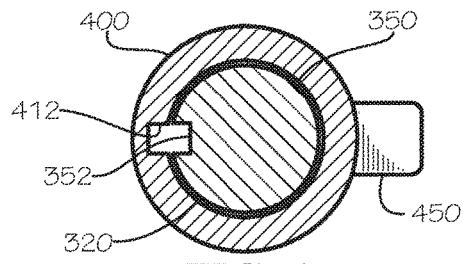
FIG. 6 is a sectional view of the buffer of the check valve of FIG. 5 taken along line 6-6 of FIG. 5.

In one aspect, as shown in FIGS. 5 and 6, the buffer 400 can comprise a body 410 defining entrance bores 438,439 permitting flow of the fluid in the fluid system to and from the buffer inner chamber 409 through the tip 430 of the body 410. The buffer 400 can also define a channel 412 extending lengthwise along the body 410 along a direction of the axis 401 and permitting flow of the fluid in the fluid system to and from the buffer inner chamber 409 through an end of the body distal from the tip 430 of the body 410. The flange 350 of the rod 320 can also define a channel 352 extending lengthwise along the flange 350 along a direction of the axis 301 and permitting flow of the fluid in the fluid system to and from the buffer inner chamber 409 past the flange 350. The presence of the channels 352,412 can allow the flange 350 of the rod 320 to fit snugly or loosely within the bore 405 while still allowing fluid to move around the flange 350 of the rod 320 and escape or "bleed" out of the buffer 400. The presence of the channels 352,412 can allow for additional fine-tuning of the bleed rate of fluid or "bleed down" from the buffer. Each of the entrance bores 438,439 can also allow flow of the fluid from the buffer when the closing member 200 separates from the buffer 400 and at least the entrance bore 439 can allow flow of the fluid back out of the buffer when the closing member 200 contacts the buffer 400.

Figure 7:
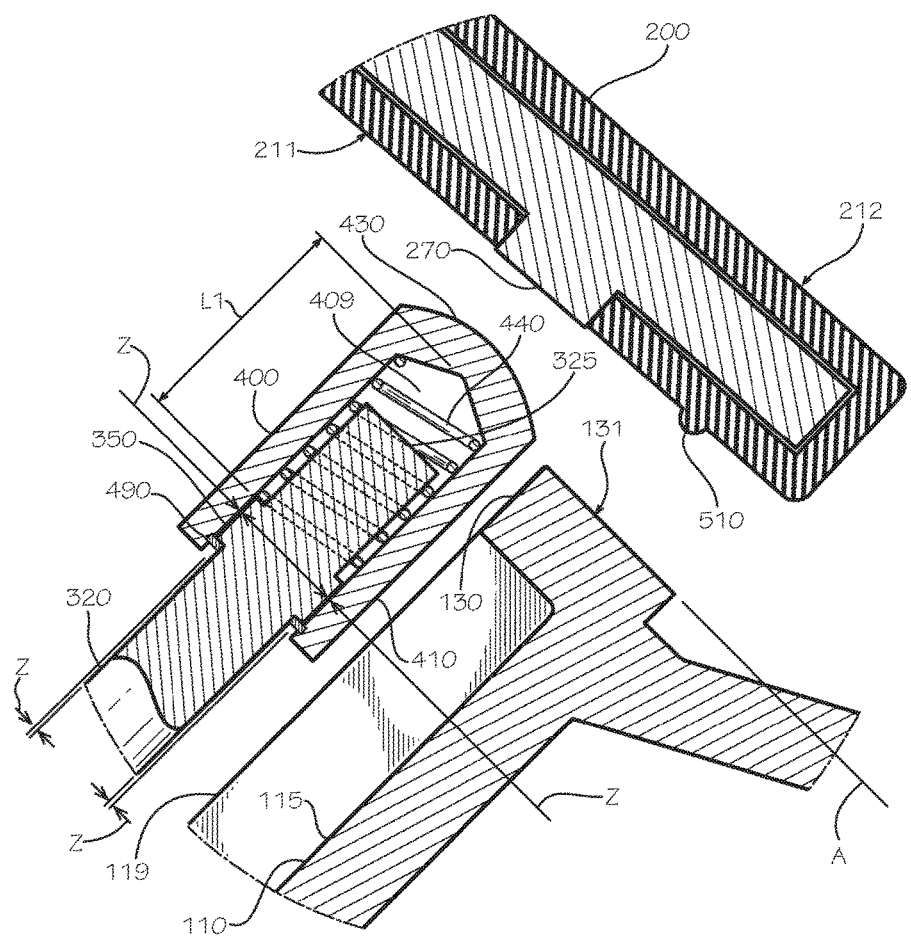
FIG. 7 is a detail view of the check valve of FIG. 3 showing the flapper in an open position.

As shown in FIG. 7, opening of the closing member 200 away from the port shoulder surface 131 of the port 130 can allow the buffer 400 to return to a fully uncompressed condition or to an extended position. With the buffer 400 in an extended position, the flange 350 can be made to contact the retaining fastener 490. In one aspect, the buffer inner chamber 409 and the interior cavity 116 of the check valve 100 can be partially sealed off from one another with only clearance gaps Z between the parts allowing for fluid communication. In another aspect, as will be described below, the tip 430 or another portion of the body 410 of the buffer 400 can define a bore (not shown) allowing passage of fluid into and out of the buffer inner chamber 409 or other means of fluid passage can be provided.

As shown in FIG. 7, the upstream surface 211 of the closing member 200 can comprise a striker 270 configured to contact the tip 430 of the buffer 400. In one aspect, the striker 270 can be integrally formed from the stiffening insert 250 of the closing member 200. In another aspect, the striker 270 can be a plate (not shown) or a fastener (not shown) fastened to or through the upstream surface 211 of the closing member 200. In yet another aspect, the striker 270 can be a co-molded rigid material on the upstream surface 211.

Figure 8:
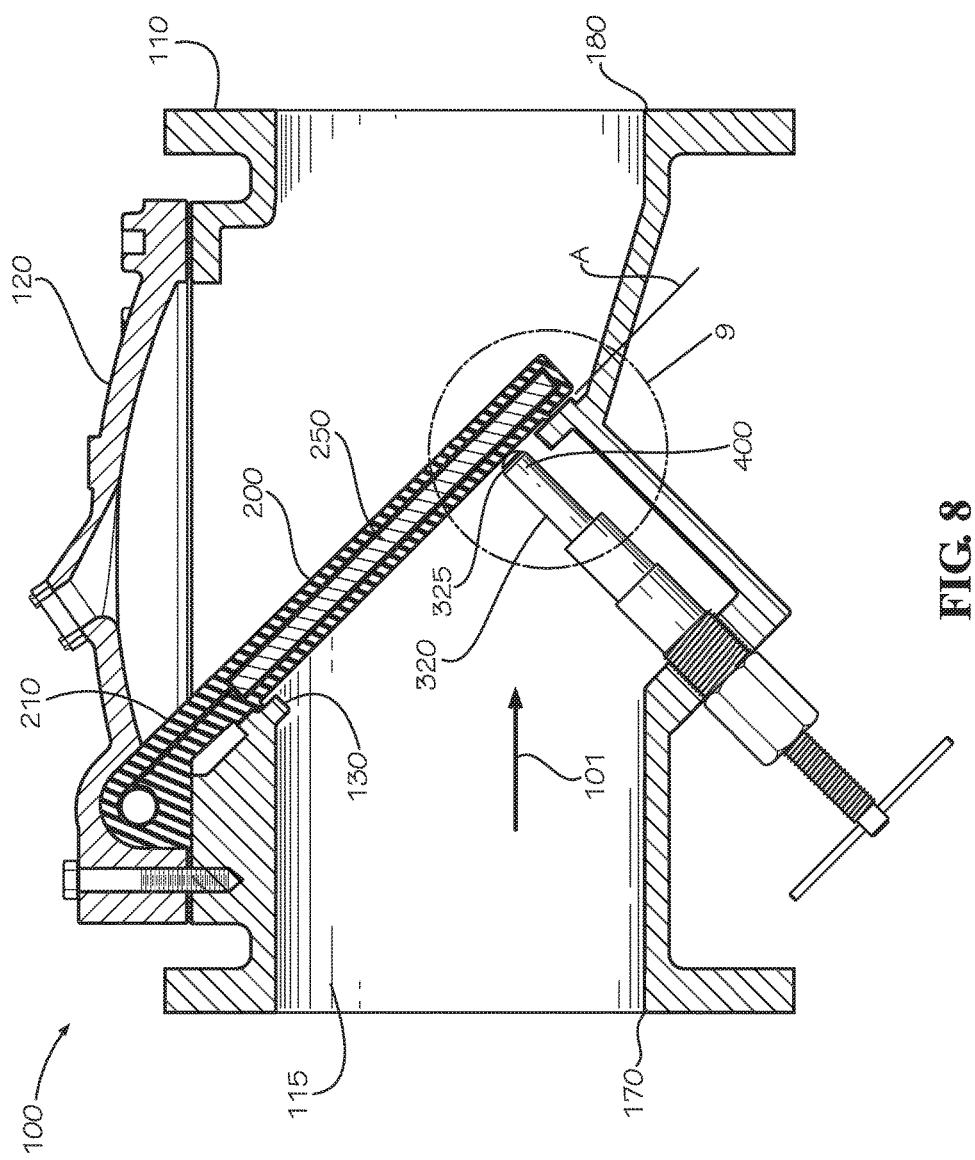
FIG. 8 is a sectional view of the check valve of FIG. 1 taken along line 2-2 of FIG. 1 in accordance with another aspect of the current disclosure wherein a buffer is mounted on and enclosed at least partly within a rod of a buffering device.

As shown in FIG. 8, the body 410 of the buffer 400, which can be mounted on the rod 320, can be further configured to be enclosed within the first end 325 of the rod 320. Accomplishing the same basic function as other structures described herein, the buffer 400 can cushion the closing member 200 when it closes while allowing the closing member 200 to come to rest in the closed position A—or at any desired resting position between the closed position A and the open position B (shown in FIG. 2).

Figure 9:
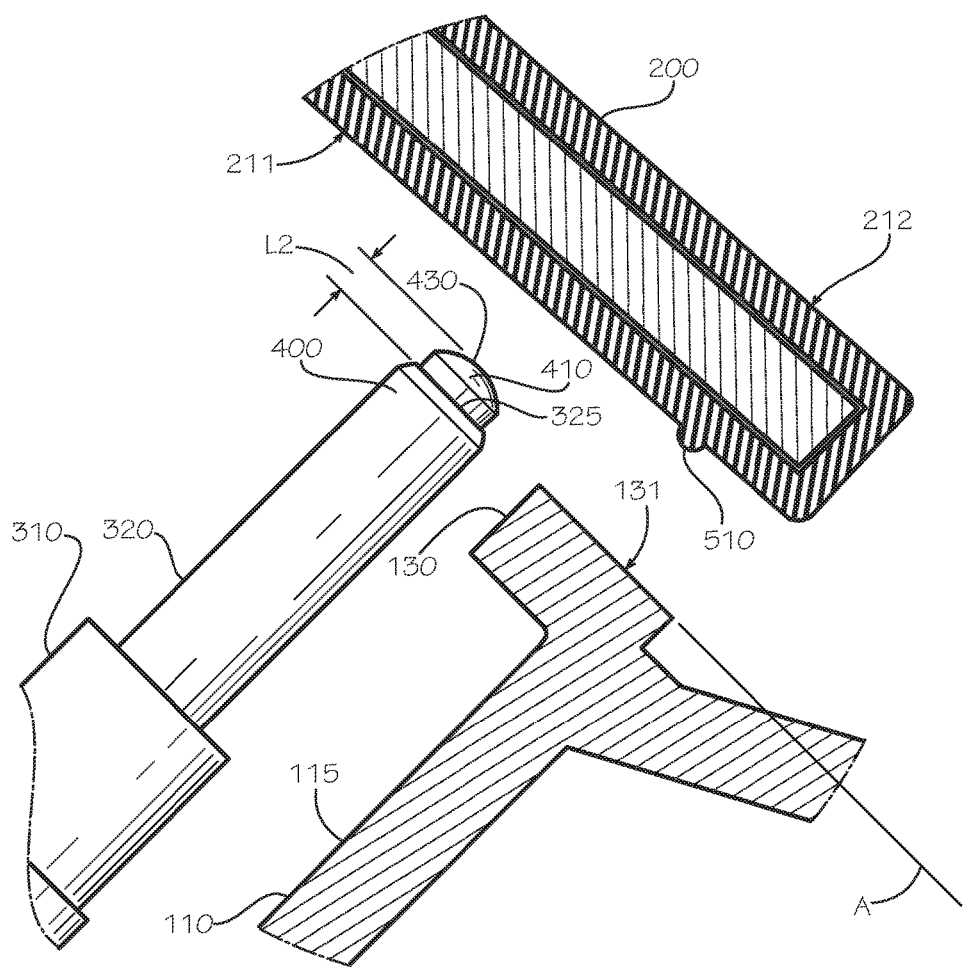
FIG. 9 is a detail view of the check valve of FIG. 8 taken from detail 9 of FIG. 8 showing the flapper in an open position.

As shown in FIG. 9, the body 410 of the buffer 400 can be configured to move into an extended position when the closing member 200 moves from the closed position A towards the open position B. A tip extension distance L2—measured from the first end 325 of the rod 320 to the axially outermost portion of the tip 430 of the body 410 of the buffer 400—in such case is greater than when a load, such as the weight of the closing member 200 when in the closed position A, contacts the tip 430 of the body 410 of the buffer 400 and thereby pushes the body 410 of the buffer 400 into the retracted position shown in FIG. 8.

Figure 10:
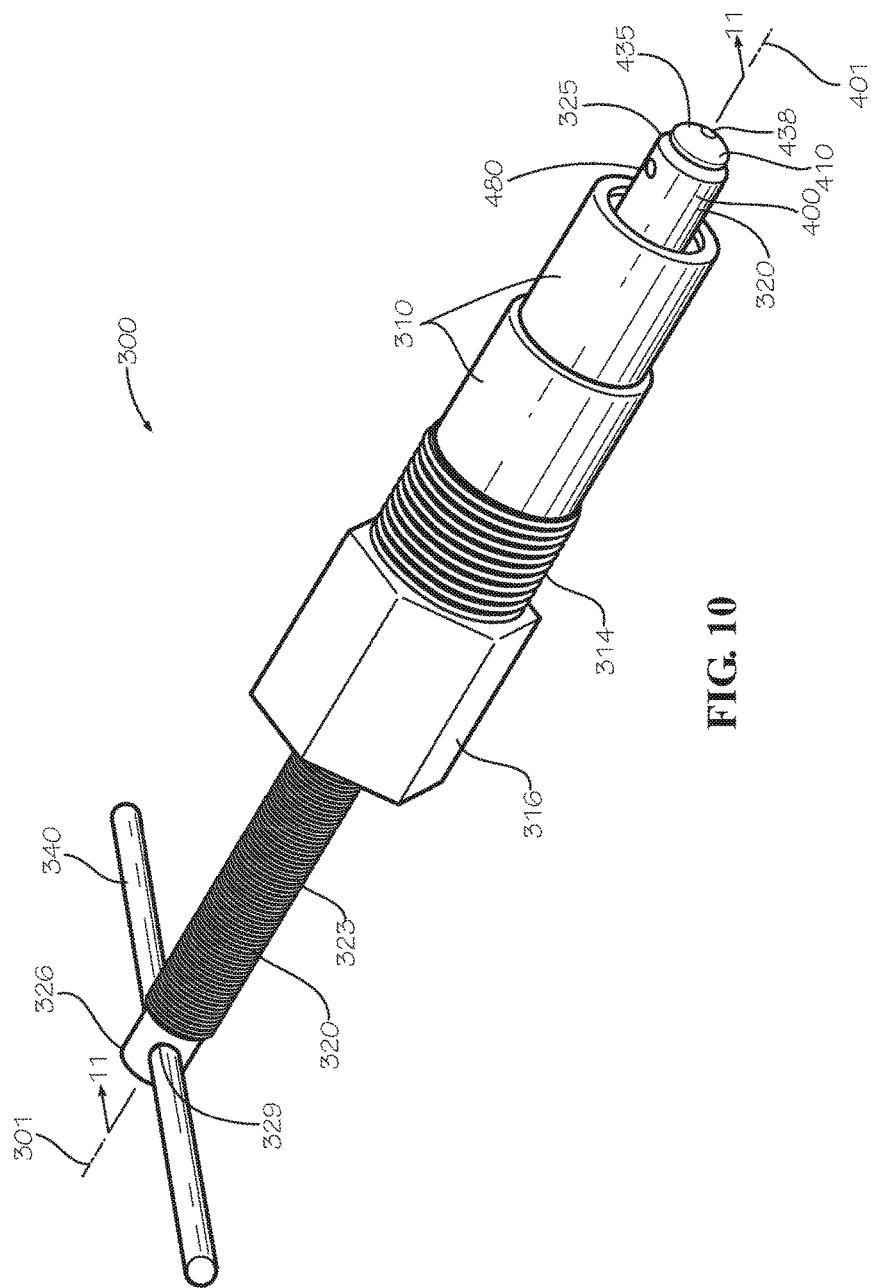
FIG. 10 is a perspective view of the buffering device of FIG. 8.

As shown in FIG. 10, the buffering device 300 can comprise the housing 310, the rod 320 defining the bore 329, the handle 340, and the buffer 400. The body 410 of the buffer 400, which can be positioned at least partially within the rod 320 as shown, can define a first end 435 defining an axially outermost portion of the buffering device 300, a second end 436 (shown in FIG. 11) distal from the first end 435, and an entrance bore such as the entrance bore 438 in the first end 435. The body 410 can be secured to the rod 320 with a fastener 480, which can be any fastener including, for example and without limitation, a spring pin or a roll pin as shown.

Figure 11:
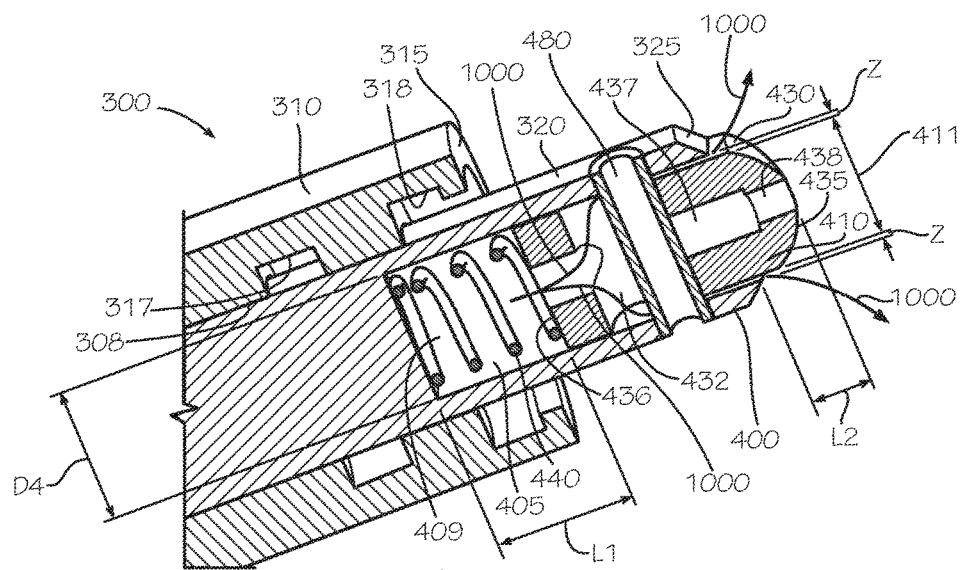
FIG. 11 is a sectional perspective view of the buffering device of FIG. 10 taken along line 11-11 of FIG. 10 showing the buffer in a retracted position.
Figure 12:
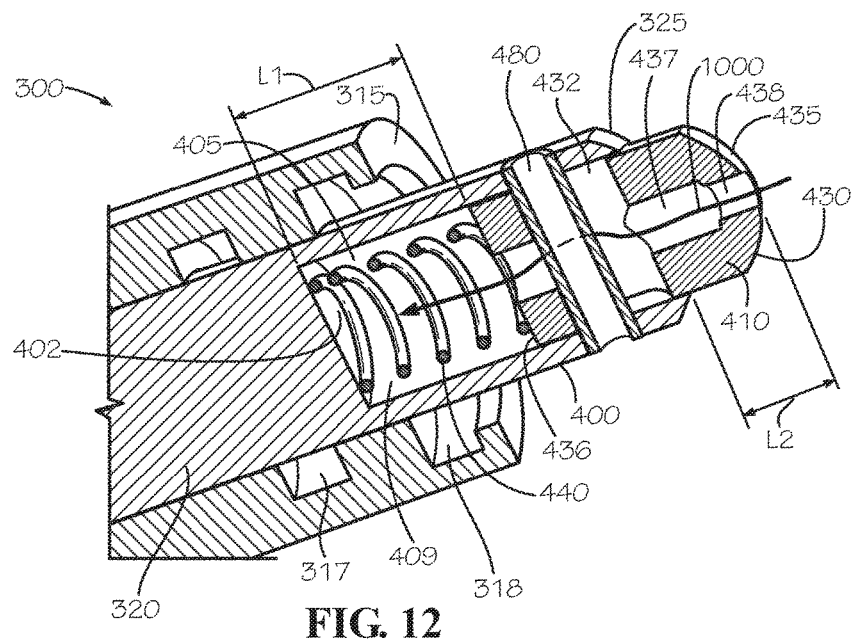
FIG. 12 is a sectional perspective view of the buffering device of FIG. 10 taken along line 11-11 of FIG. 10 showing the buffer in an extended position.

FIGS. 11 and 12 show sectional views of the buffering device 300 of FIG. 10 in a retracted position and an extended position, respectively. As shown in FIG. 11, the body 410 of the buffer 400 can fit within the buffer inner chamber 409, which can be defined in the first end 325 of the rod 320. A diameter 411 of the body 410 can be substantially equal to or slightly smaller than a diameter D4 of the inner chamber 409 in order to allow free movement of the body 410 inside the first end 325 of the rod 320. The buffer 400 can further define a clearance gap Z between the body 410 and the bore 405 that can be made large enough to allow passage of the fluid inside the fluid system and inside the buffer inner chamber 409. The biasing element 440 can be positioned between the second end 436 of the body 410 and a bottom 402 (shown in FIG. 12) of the bore 405. The tip extension distance L2 corresponding to a retracted position of the body 410 is shown in FIG. 11, while the tip extension distance L2 corresponding to an extended position of the body 410 is shown in FIG. 12.

A slot 432 can be defined in the body 410 and can be sized to receive the fastener 480. The slot 432 can be positioned between the first end 435—or the entrance bore 438—and the second end 436 to facilitate movement of the body 410 between the retracted position and the extended position. A fluid bore 437 can be defined in the body 410 between the first end 435 and the second end 436 and can be connected to the entrance bore 438 and can facilitate movement of the fluid along a fluid path 1000 at least into the buffer inner chamber 409 from the area outside of the buffer 400 as the body 410 is made to extend. At least when the entrance bore 438 is defined in a portion of the tip 430 of the body 410 that is not covered or sealed by the closing member 200 when the closing member 200 contacts the buffer 400, the fluid bore 437 through the entrance bore 438 can facilitate movement of the fluid along a fluid path 1000 out of the buffer inner chamber 409 into the area outside of the buffer 400 as the body 410 is made to retract. Either the fluid bore 437 or the clearance gaps Z or both thereby can place the buffer inner chamber 409 in fluid communication with the interior cavity 116. For example, the area outside the buffer 400 can comprise, for example and without limitation, the interior cavity 116 of the valve body 110.

The housing 310 can comprise a first end 315 that can be proximate to the first end 325 of the rod 320 as shown. The housing 310 can define a first annular groove 317 and a second annular groove 318 in an interior bore 308 of the housing 310. Each of the first annular groove 317 and the second annular groove 318 can be configured to receive a seal (not shown) for preventing movement of the fluid in the space, however small, between the housing 310 and the rod 320. Such a seal can be, for example and without limitation, an O-ring or a wiper seal.

As shown in FIG. 12, the fluid bore 437 can facilitate movement of the fluid along a fluid path 1000 between the area outside of the buffer 400 and the buffer inner chamber 409 as the pressure or load against the tip 430 of the body 410 is removed.

Figure 13:
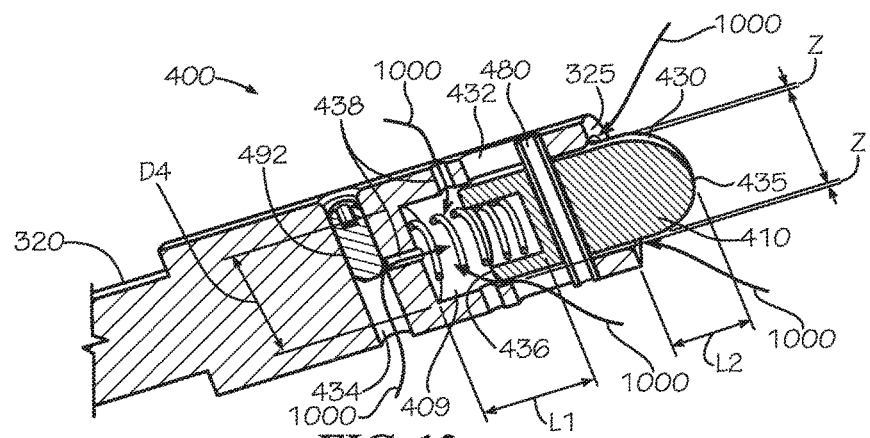
FIG. 13 is a sectional perspective view of the buffering device of FIG. 10 taken along line 11-11 of FIG. 10 in accordance with another aspect of the current disclosure and showing the buffer in an extended position.
Figure 14:
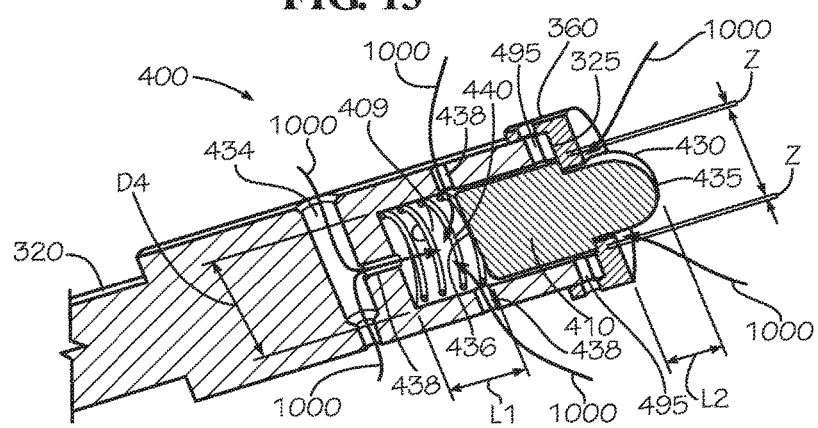
FIG. 14 is a sectional perspective view of the buffering device of FIG. 10 taken along line 11-11 of FIG. 10 in accordance with another aspect of the current disclosure and showing the buffer in an extended position.
Figure 15:
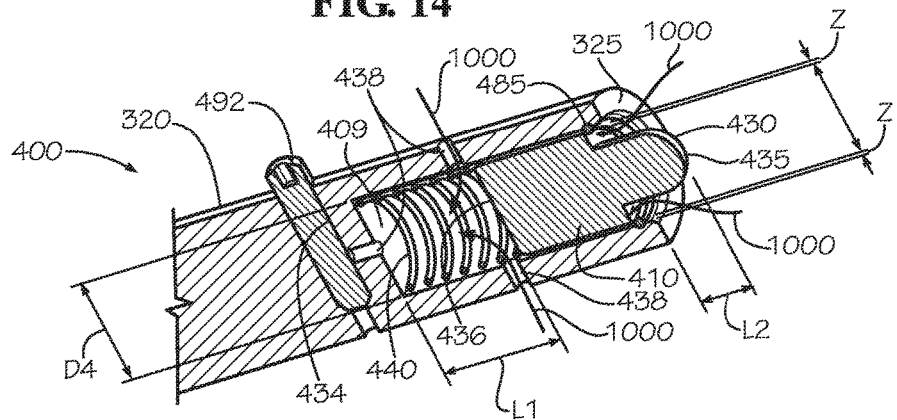
FIG. 15 is a sectional perspective view of the buffering device of FIG. 10 taken along line 11-11 of FIG. 10 in accordance with another aspect of the current disclosure and showing the buffer in an extended position.

FIGS. 13-15 show sectional views of various aspects of the body 410 of the buffer 400 in the extended position. As shown in FIG. 10, the body 410 of each of FIGS. 13-15 can be positioned at least partially within the rod 320. As shown in FIG. 13, the slot 432 can be defined in the rod 320 and the fastener 480 can be configured to slide axially along the slot 432 between an extended position and a retracted position (not shown) of the body 410. The rod 320, which can be increased in diameter in the area of the buffer 400 as shown, can define more than one entrance bore 438 placing the buffer inner chamber 409 into fluid communication with the interior cavity 116. In one aspect, a pair of the entrance bores 438 can extend in opposing radial directions from the buffer inner chamber 409. In another aspect, a third instance of the entrance bore 438 can extend in an axial direction from the buffer inner chamber 409 to a transverse bore 434 defined in the rod 320. The third entrance bore 438 can be left open, closed, or partially open as desired by adjustment in or out of an adjustment fastener 492 that can be assembled in the transverse bore 434. Both of the adjustment fastener 492 and the transverse bore 434 can be threaded to match. By adjusting or repositioning the adjustment fastener 492, a bleed rate of the fluid from or to the buffer inner chamber 409 through at least one of the entrance bores 438 can be adjusted.

As shown in FIG. 14, no slot 432 is required. Instead, for example, a buffer cap 360 can be used to restrain movement of the body 410 of the buffer 400 between an extended position and a retracted position (not shown). The buffer cap 360 can be secured to the first end 325 of the rod 320 by fasteners (not shown) installed in fastener bores 495. The buffer 400 is shown without the adjustment fastener 492.

As shown in FIG. 15, again no slot 432 is required. Instead, for example, a fastener such as the retaining fastener 485 can be used to restrain movement of the body 410 of the buffer 400 between an extended position and a retracted position (not shown). The retaining fastener 485 can be secured inside a groove defined in the rod 320 proximate to the first end 325 of the rod 320. The buffer 400 is again shown with the adjustment fastener 492.

While each potential fluid paths is not necessarily shown, the entrance bores 438 defined in the radially outer surface can provide for fluid communication into the buffer inner chamber 409, and the entrance bore 438 positioned along the axis 401 of the buffer and the axis 301 of the rod 320 can provide for variable fluid communication into or out of the buffer inner chamber 409 based on the position of the adjustment fastener 492 inside the transverse bore 434. Decreasing either the diameter of each of the entrance bores 438 while keeping their quantity constant or decreasing the quantity of the entrance bores 438 while keeping their diameters constant can effectively increase the resistance to movement of the body 410, and the biasing element 440 can cause the body 410 to remain in the extended position by default unless and until the closing member 200, for example and without limitation, contacts the body 410 and thereby causes the body 410 to retract.

In various aspects as described herein, the rod 320 and the buffer 400 can both be part of the buffering device 300, which can be in the form of a hold-open device. In another aspect, no hold-open device is required per se. For example and without limitation, the rod 320 and the buffer 400 can be incorporated into the port 130 or some other portion of the check valve 100, or the rod 320 and the buffer 400 can be installed in the access port 201 but without all of the features of the buffering device 300 described herein. In yet another aspect, such as when the buffer 400 is mounted on the closing member 200, the buffer 400 can be configured to move with the closing member 200. The buffer 400 can further be configured to engage the rod 320 proximate to the closed position A of the closing member 200 and separate from the rod 320 proximate to the open position B or intermediate position C of the closing member 200.

A method of using a check valve 100 in a fluid system comprising a fluid can comprise moving a closing member 200 positioned inside the interior cavity 116 of the check valve 100 toward the open position B, moving the closing member 200 of the check valve 100 toward the closed position A, and stopping movement of the closing member 200 when the closing member 200 is in a position proximate to the closed position A with the buffer 400 configured to hold a portion of the fluid and mounted on the first end 325 of the rod 320 of the buffering device 300.

The method can further comprise cushioning movement of the closing member 200 from the open position B to the closed position A when the closing member 200 is proximate to the closed position A. The method of stopping movement of the closing member 200 can comprise moving fluid from the buffer inner chamber 409 to a portion of the interior cavity 116 of the valve body 110 that is outside the buffer 400. The method can further comprise contacting an upstream surface 211 of the closing member 200 with a tip 430 of the buffer 400. The method of stopping the movement of the closing member can comprise contacting the striker 270 with the tip 430 of the rod 320. The method can further comprise opening the closing member 200 and decompressing the biasing element 440 such that the tip 430 of the buffer 400 moves toward an extended position. The method can further comprise moving a tip 430 of the buffer 400 from an extended position to a retracted position. The method of cushioning movement of the closing member 200 from the open position B to the closed position A can comprise using the fluid in the buffer inner chamber 409 of the buffer 400 to cushion movement of the buffer 400, thereby cushioning movement of the closing member 200. The method can further comprise adjusting the cushion of the buffer 400 from a first setting to a second setting so that the fluid in the buffer inner chamber 409 of the buffer 400 bleeds at a one of a higher rate and a lower rate relative to the first setting. The method of adjusting the cushion of the buffer 400 can comprise repositioning the adjustment fastener 492 of the buffer 400.

In various aspects, the buffer 400 cannot leak because the fluid used inside the buffer 400 for buffering can be simply the fluid being stored and/or transported inside the fluid system comprising the check valve 100. When the buffering device 300 uses a fluid other than that the fluid inside the fluid system (for example, air, hydraulic fluid, or oil instead of water), such a fluid must sometimes be kept separated to avoid degradation in performance or failure altogether of the check valve. In addition, the degree of buffering of the closing member 200 can be made infinitely variable in that each rotation in a clockwise (CVV) or counterclockwise (CCVV) direction can increase or decrease the amount of fluid to "bleed down" from the buffer inner chamber 409. In addition, the buffering device 300 can still function as any hold-open device (for example, to be able to drain the line through the access port 201 shown in FIG. 2) by holding the closing member 200 and therefore the check valve open by any degree as desired.

The advantages of various aspects of the check valve 100 and in particular the buffer 400 described herein can include reduction or elimination of valve slam caused by forceful closing of the closing member 200, a flow increase due to reduced CV losses caused by stiff-acting return springs (not shown), leak prevention due to the elimination of bottom buffer or side buffer hydraulic cylinders sometimes used on currently available check valves by others, infinitely adjustable metering with the buffering device 300, and multipurpose use of the buffering device 300. In addition, the check valve 100 disclosed herein can be produced much less inexpensively than currently available check valves using an air, hydraulic, or oil cushion cylinder assembly.

As described above, when a pump positioned upstream from a check valve 100 in a fluid system shuts down, any delay between when the pump stops pushing the fluid and when the check valve 100 is fully closed can allow the fluid to flow in reverse. This reverse flow can cause the closing member 200 or its equivalent to slam closed, resulting in "water hammer" that the buffer 400 disclosed herein is configured to reduce or eliminate. In one aspect, even cushioning the closing member 200 just before closure, such as in the last 10% of closure—without necessarily increasing the speed of closure of the closing member 200, can reduce or eliminate water hammer. In another aspect, cushioning the closing member 200 when the closing member 200 is already more than 90% closed relative to the open position A can reduce or eliminate water hammer. In yet another aspect, cushioning the closing member 200 when the closing member 200 is less than 90% closed relative to the open position A can reduce or eliminate water hammer.

As described above, a check valve 100 can be not only a valve described as a check valve such as a flapper check valve but also any valve that regulates flow of a fluid including the aforementioned swing check valves and tilting or slanting disc check valves. The buffer 400 can be mounted in a myriad of ways and in orientations contemplated by the disclosure but not explicitly shown. In another aspect, the systems and methods disclosed herein can work with a metal to metal seat as well, such as when both a closing member and a seat or a seat ring against which the closing member seats are both formed from metal or comprise metal.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A check valve for a fluid system, the check valve comprising:
   a valve body defining an inlet, an outlet, and an interior cavity extending from the inlet to the outlet, the valve body comprising an access port;
   a flapper positioned inside the interior cavity, the flapper movable between an open position, providing fluid communication between the inlet and outlet, and a closed position, isolating the inlet from the outlet;
   a rod secured to the access port of the valve body, the rod positioned at least partially inside the valve body and comprising a first end proximate to the flapper and a second end distal from the first end, the rod positioned at an angle with respect to the flapper, an axially outermost portion of the first end of the rod relative to an axis defined by the rod facing an upstream surface of the flapper and defining an inner chamber; and
   a buffer mounted on the first end of the rod, a body of the buffer received within the inner chamber rod, the buffer further defining a one of an entrance bore in the body of the buffer and a clearance gap between the body of the buffer and the rod, the buffer configured to hold a portion of fluid in the fluid system and cushion movement of the flapper from the open position to the closed position when the flapper is proximate to the closed position, the inner chamber in fluid communication with the interior cavity of the valve body via the one of the entrance bore and the clearance gap.

2. The check valve of claim 1, wherein the body of the buffer defines a rounded tip.

3. The check valve of claim 1, wherein the upstream surface of the flapper comprises a striker against which the body of the buffer is configured to contact.

4. The check valve of claim 1, wherein the buffer defines the entrance bore configured to allow fluid communication between the inner chamber and the interior cavity of the valve body, the entrance bore defined in a first end of the body of the buffer, the entrance bore defined in a portion of the body of the buffer not received within the inner chamber.

5. The check valve of claim 1, wherein the buffer is movable with respect to the rod between an extended position and a retracted position.

6. The check valve of claim 5, wherein the buffer comprises a biasing element configured to maintain a tip of the buffer in the extended position.

7. The check valve of claim 1, wherein a distance from the first end of the rod to the flapper is adjustable by manipulation of the second end of the rod from outside the valve body.

8. A check valve for a fluid system, the check valve comprising:
   a valve body defining an inlet, an outlet, and an interior cavity;
   a closing member positioned inside the interior cavity, the closing member movable between an open position, providing fluid communication between the inlet and outlet, and a closed position, isolating the inlet from the outlet; and
   a buffer comprising:
      a rod positioned at least partially inside the valve body and comprising a first end proximate to the closing member and a second end distal from the first end, an axially outermost portion of the first end of the rod relative to an axis defined by the rod facing an upstream surface of the closing member and defining an inner chamber; and
      a body mounted inside the first end of the rod, a one of the rod and the body defining a slot extending in a transverse direction across the one of the rod and the body, the slot configured to permit movement of the body with respect to the rod in a direction parallel to the axis of the rod, the buffer configured to hold a portion of fluid in the fluid system and cushion movement of the closing member from the open position to the closed position.

9. The check valve of claim 8, wherein the slot is defined in the body of the buffer, travel of the body of the buffer inside the inner chamber limited by a fastener secured through the rod and extending through the slot.

10. The check valve of claim 9, wherein the upstream surface of the closing member comprises a striker against which the buffer is configured to contact.

11. The check valve of claim 8, wherein the inner chamber is in fluid communication with the interior cavity of the valve body.

12. The check valve of claim 8, wherein a distance from the first end of the rod to the closing member is adjustable.

13. The check valve of claim 12, wherein the distance is adjustable by manipulation of the second end of the rod from outside the valve body.

14. A method of using a check valve in a fluid system comprising a fluid, the method comprising:
    moving a closing member positioned inside an interior cavity of the check valve toward an open position, the open position providing fluid communication between an inlet and an outlet of the check valve, the check valve comprising a valve body defining the inlet, the outlet, and the interior cavity;
    moving the closing member of the check valve toward a closed position; and
    stopping movement of the closing member when the closing member is in a position proximate to the closed position with a buffer configured to hold a portion of the fluid, the buffer comprising:
        a rod defining an inner chamber in a first end and defining a second end distal from the first end; and
        a body received within the inner chamber, the buffer further defining a one of an entrance bore in the body of the buffer and a clearance gap between the body of the buffer and the rod, the buffer configured to cushion movement of the closing member from the open position to the closed position when the closing member is proximate to the closed position, the inner chamber in fluid communication with the interior cavity of the valve body via the one of the entrance bore and the clearance gap.

15. The method of claim 14, wherein stopping movement of the closing member comprises moving fluid from the inner chamber to a portion of the interior cavity of the valve body that is outside the buffer.

16. The method of claim 14, further comprising contacting an upstream surface of the closing member with a tip of the buffer.

17. The method of claim 16, wherein the upstream surface of the closing member comprises a striker and wherein stopping the movement of the closing member comprises contacting the striker with the tip of the buffer.

18. The method of claim 14, wherein the buffer further comprises a biasing element, the method further comprising opening the closing member and decompressing the biasing element such that a tip of the buffer moves toward an extended position.

19. The method of claim 14, further comprising moving a tip of the body of the buffer from an extended position to a retracted position.

20. The method of claim 19, wherein a one of the rod and the body defines a slot extending in a transverse direction across the one of the rod and the body, the method further comprising limiting travel of the body of the buffer by a fastener extending through the slot.

21. The method of claim 14, further comprising adjusting the cushion of the buffer from a first setting to a second setting so that the fluid in the inner chamber bleeds at a one of a higher rate and a lower rate relative to the first setting.

22. The method of claim 21, wherein adjusting the cushion of the buffer comprises repositioning an adjustment fastener of the buffer.

23. The method of claim 14, wherein a distance from the first end of the rod to the closing member is adjustable by manipulation of the second end of the rod from outside the valve body.

* * * * *